United States Patent
Clinesmith et al.

(10) Patent No.: US 7,698,231 B2
(45) Date of Patent: Apr. 13, 2010

(54) COMPUTER-IMPLEMENTED METHOD AND SYSTEM FOR GLOBAL PURCHASING

(75) Inventors: Robin Clinesmith, Livonia, MI (US); Deborah Kiura, Novi, MI (US); Ken Mosier, Orion, MI (US)

(73) Assignee: Ford Motor Company, Dearborn, MI (US)

( * ) Notice: Subject to any disclaimer, the term of this patent is extended or adjusted under 35 U.S.C. 154(b) by 1447 days.

(21) Appl. No.: 10/464,350

(22) Filed: Jun. 18, 2003

(65) Prior Publication Data

US 2004/0054603 A1    Mar. 18, 2004

Related U.S. Application Data

(60) Provisional application No. 60/390,004, filed on Jun. 19, 2002.

(51) Int. Cl.
*G06F 17/60*    (2006.01)
(52) U.S. Cl. ........................................................ 705/80
(58) Field of Classification Search .................... 705/80
See application file for complete search history.

(56) References Cited

U.S. PATENT DOCUMENTS

| | | | |
|---|---|---|---|
| 4,509,123 A | 4/1985 | Vereen |
| 4,799,156 A | 1/1989 | Shavit |
| 5,319,542 A | 6/1994 | King, Jr. |
| 5,666,493 A | 9/1997 | Wojcik |
| 5,758,328 A | 5/1998 | Giovannoli |
| 5,758,329 A | 5/1998 | Wojcik |
| 5,842,178 A | 11/1998 | Giovannoli |
| 5,940,807 A | 8/1999 | Purcell |
| 5,970,475 A | 10/1999 | Barnes |
| 6,038,597 A | 3/2000 | Van Wyngarden |
| 6,055,516 A | 4/2000 | Johnson |
| 6,055,519 A | 4/2000 | Kennedy |
| 6,081,789 A | 6/2000 | Purcell |
| 6,167,378 A | 12/2000 | Weber, Jr. |
| 6,167,385 A | 12/2000 | Hartley-Urquhart |
| 6,233,565 B1 | 5/2001 | Lewis |
| 6,246,994 B1 | 6/2001 | Wolven |
| 6,324,522 B2 | 11/2001 | Peterson |
| 6,343,277 B1 | 1/2002 | Gaus |

(Continued)

FOREIGN PATENT DOCUMENTS

JP    2007172605 A * 7/2007

OTHER PUBLICATIONS

Computer compact disc entitled "Oracle Applications 11i" Documentation Library Release 11.5.1.

(Continued)

*Primary Examiner*—Pierre E Elisca
(74) *Attorney, Agent, or Firm*—Raymond L. Coppiellie; Brooks Kushman P.C.

(57) ABSTRACT

A computer-implemented method for creating blanket purchase agreements in a manufacturing enterprise is disclosed. The method includes identifying one or more products or services needed for a first and second locations, identifying one or more suppliers having the capability of delivering the one or more products or services to the first and second locations, and creating a blanket purchase agreement (BPA). The first location operates in a first legal entity and the second location operates in a second legal entity.

33 Claims, 11 Drawing Sheets

U.S. PATENT DOCUMENTS

| | | |
|---|---|---|
| 6,351,738 B1 | 2/2002 | Clark |
| 6,363,365 B1 | 3/2002 | Kou |
| 6,363,488 B1 | 3/2002 | Ginter |
| 6,418,416 B1 | 7/2002 | Rosenburg |
| 6,505,172 B1 | 1/2003 | Johnson |
| 6,513,712 B2 * | 2/2003 | Shoda et al. ............... 235/441 |
| 6,805,290 B2 * | 10/2004 | Walker et al. ............... 235/383 |
| 2002/0046176 A1 | 4/2002 | Seo |
| 2002/0055888 A1 | 5/2002 | Beran |
| 2002/0065782 A1 | 5/2002 | Lee |
| 2002/0077958 A1 | 6/2002 | Gardner |
| 2002/0091594 A1 | 7/2002 | Rosenberg |
| 2002/0143667 A1 | 10/2002 | Ho |
| 2002/0178021 A1 | 11/2002 | Melchior |
| 2002/0188499 A1 | 12/2002 | Jenkins |
| 2003/0014299 A1 | 1/2003 | Hoffman |
| 2003/0036972 A1 | 2/2003 | Zamma |
| 2003/0036991 A1 | 2/2003 | Fortes |

OTHER PUBLICATIONS

Article entitled "eProcurement Ensures Visionary Companies a Place in the New Economy", Analyst: Albert Pang Copyright 2001.

* cited by examiner

Fig. 6

| Line Type | Value Basis | Description |
|---|---|---|
| APN Goods | Quantity | Advance Purchase Notification |
| APN Services | Amount | Advance Purchase Notification |
| FMC TRANSPORTATION | Quantity | FMC Transportation |
| Goods | Quantity | All goods that are individually |
| Lump Sum | Amount | Lump Sum |
| Negative Lump Sum | Amount | Negative Lump Sum |
| NEGATIVE64 | Quantity | Negative 64 receipt |
| POSITIVE64 | Quantity | Positive 64 receipt |
| Rate | Quantity | Procurement Goods |
| Re-Sourcing Tooling | Quantity | Zero Cost Tooling for Re-Sour |
| Recurring Payment | Quantity | Recurring Payments fopr auto |
| Safety Goods | Quantity | Safety Goods to be approved |
| Safety Services | Amount | Safety Services to be Approve |
| Service | Amount | Amount-based Service |
| Tooling | Quantity | Tooling |

| | Org Code | Inventory-Org Name | Supplier/Distributor | Supplier Site | Contact | CMS |
|---|---|---|---|---|---|---|
| ▶ | A01 | CENTRAL STAFFS_A01 | Q171_ANCHOR LAMINA - AM | Q171A | Martin,Mike | ☐ |
| ▶ | A71 | FORD MOTOR LAND DEVELOP | Q171_ANCHOR LAMINA - AM | Q171A | Martin,Mike | ☐ |
| ▶ | A10 | ADVANCE VEHICLE TECHNOL | Q171_ANCHOR LAMINA - AM | Q171A | Martin,Mike | ☐ |
| ▶ | B67 | CHIHUAHUA ENGINE_B67 | Q171_ANCHOR LAMINA - AM | Q171A | Martin,Mike | ☐ |
| ▶ | A30 | JAGUAR US_A30 | Q171_ANCHOR LAMINA - AM | Q171A | Martin,Mike | ☐ |
| ▶ | F11 | NATIONAL PARTS DEPOT - F0 | Q171_ANCHOR LAMINA - AM | Q171A | Martin,Mike | ☐ |
| ▶ | A05 | QMP FAO STAFF SERVICES_A | Q171_ANCHOR LAMINA - AM | Q171A | Martin,Mike | ☐ |
| ▶ | A91 | FORD LEASING DEVELOPMEN | Q171_ANCHOR LAMINA - AM | Q171A | Martin,Mike | ☐ |
| ▶ | B92 | WAYNE STAMPING_B92 | Q171_ANCHOR LAMINA - AM | Q171A | Martin,Mike | ☐ |
| ▶ | B16 | WAYNE STAMPING AND ASSE | Q171_ANCHOR LAMINA - AM | Q171A | Martin,Mike | ☐ |

COMPUTER-IMPLEMENTED METHOD AND SYSTEM FOR GLOBAL PURCHASING

CROSS-REFERENCE TO RELATED APPLICATIONS

This application claims the benefit of U.S. provisional application Ser. No. 60/390,004, filed Jun. 19, 2002, and entitled "Method and System for Global Purchasing".

BACKGROUND OF THE INVENTION

1. Field of the Invention

One of the aspects of the present invention relates generally to a method and system for global purchasing and, more specifically, a method and system for global purchasing that includes using blanket purchase agreements.

2. Background Art

Distributed enterprises are organizations that have multiple operating units (OUs) spread across geographical regions, including continents and the entire world. In the existing business environment, many businesses have operating facilities located in multiple countries and continents. For example, an automobile manufacturer can have multiple management facilities, engineering facilities, manufacturing facilities, assembly facilities, distribution facilities, sales facilities and service facilities located within several countries and continents. These facilities commonly deal with a second-tier of equally-distributed supplier communities.

In distributed enterprises, procurement can be divided into two main categories: direct and indirect. Direct materials procurement includes the purchasing of resources that make up the product ultimately being manufactured. Indirect procurement includes the purchasing of "support" resources that are necessary to bring about the manufacture of the product. Direct material buyers are generally responsible for procuring the direct materials for production plants, otherwise referred to as ship-to locations, from suppliers that may have different supplier sites, otherwise referred to as ship-from locations, on the same blanket purchasing agreement (BPA). Indirect material buyers generally have the same responsibility with respect to procuring non-production materials. Consequently, direct and indirect material buyers typically negotiate global BPAs. In some instances, the buyer is responsible for buying materials for several ship-to locations that could span across multiple legal entities, such as national companies or OUs, located in one or more countries.

The negotiation of global BPAs present unique complications for buyers. In some of these circumstances, material price could vary by plant and within the same plant and material prices can also vary by dates depending on the "effective dates" for the price of the materials. Additionally, buyers are not usually aware of the exact material quantities to be bought or their delivery schedules. This information may be available once a production plan is finalized. Consequently, buyers can only set up a BPA with suppliers as to supply terms, with exact order being given at a later time.

Conventional global purchasing management software does not address these complications. For example, blanket order and blanket release functionality in Oracle applications have the following limitations: each blanket order can be created for only one supplier and one supplier site, a blanket order release has no supplier or supplier site specification and can only be created for the supplier and supplier site on blanket order agreement, a blanket order can only have one ship to location, blanket orders are not renewable automatically, blanket orders are restricted to only one operating unit, and blanket orders do not have a maximum release value which can automatically route them to a buyer for intervention.

Conventional systems prevent buyers from negotiating global BPAs. As a result, a buyer responsible for a specific part across OUs commonly creates and maintains several BPAs in each of the OUs. The creation of several different global BPAs is not feasible since it is overly burdensome to maintain such a system.

A method and system is needed in which the buyer has the ability to buy products and services for both manufacturing and non-manufacturing locations across legal entities. Buyers should be able to buy globally without having to switch operating units within purchasing management software.

SUMMARY OF THE INVENTION

According to a first embodiment of the present invention, a computer-implemented method for creating blanket purchase agreements in a manufacturing enterprise is disclosed. The method includes identifying one or more products or services needed for a first and second locations, identifying one or more suppliers having the capability of delivering the one or more products or services to the first and second locations and creating a blanket purchase agreement (BPA).

The one or more suppliers can have the capability of delivering the one or more products or services to the first and second locations based on one or more supply terms. The one or more supply terms can be defined by a buyer and can include at least a price. In addition, the blanket BPA can include a coverage, a supplier and supplier site description, a supplier indicator and/or a maximum release value.

The first location can operate in a first legal entity and the second location can operate in a second legal entity. The BPA can include descriptions for the one or more products or services needed for the first and second locations and the supply terms. The BPA can be relied upon for procurement of the one or more products or services.

The method can further include updating an item master database to obtain an updated item master database based on the BPA. Additionally, the method can include reallocating the BPA from the buyer to a reallocated buyer. The one or more supply terms can include a payment plan. The method can further include receiving a part history for the one or more products and services. The part history can include one or more superceded part prices. The method can further include searching the part history for the one or more superceded part prices. The BPA can include one or more plant-specific prices and one or more price effective dates.

According to a second embodiment of the present invention, a computer-implemented system for creating blanket purchase agreements in a manufacturing enterprise is disclosed. The system includes at least one server computer for communicating with at least one client computer. The at least one server computer can be configured to identify one or more products or services needed for a first and second locations, identify one or more suppliers having the capability of delivering the one or more products or services to the first and second locations based on one or more supply terms, and create a blanket purchase agreement (BPA).

The first location can operate in a first legal entity and the second location can operate in a second legal entity. The one or more supply terms can be defined by a buyer and can include at least a price. The BPA can include descriptions for the one or more products or services needed for the first and second locations and the supply terms. The BPA can be relied upon for procurement of the one or more products or services.

The at least one server computer can be further configured to update an item master database to obtain an updated item master database based on the BPA. The at least one server computer can be further configured to reallocate the BPA from the buyer to a reallocated buyer. The one or more supply terms can include a payment plan. The at least one server computer can be further configured to receive a part history for the one or more products or services. The part history can include one or more superceded part prices. The at least one server computer can be further configured to search the part history for one or more superceded part prices. The BPA can include one or more plant-specific prices and one or more price effective dates.

According to a third embodiment of the present invention, a computer-readable product for creating blanket purchase agreements in a manufacturing enterprise is disclosed. The product can be produced by a computer-implemented process. The process can include identifying one or more products or services needed for a first and second locations, identifying one or more suppliers having the capability of delivering the one or more products or services to the first and second locations based on one or more supply terms, creating a blanket purchase agreement (BPA), and storing the BPA in a computer-readable product.

The first location can operate in a first legal entity and the second location can operate in a second legal entity. The one or more supply terms can be defined by a buyer and can include at least a price. The BPA can include descriptions for the one or more products or services needed for the first and second locations and the supply terms. The BPA can be relied upon for procurement of the one or more products or services. The BPA can be stored in a purchasing database.

According to a fourth embodiment of the present invention, a program for controlling a computer of a server for creating blanket purchase agreements in a manufacturing enterprise is disclosed. The program includes instructions for identifying one or more products or services needed for a first and second locations, instructions for identifying one or more suppliers having the capability of delivering the one or more products or services to the first and second locations based on one or more supply terms, and instructions for creating a blanket purchase agreement (BPA).

The first location can operate in a first legal entity and the second location can operate in a second legal entity. The one or more supply terms can be defined by a buyer and can include at least a price. The BPA can include descriptions for the one or more products or services needed for the first and second locations and the supply terms. The BPA can be relied upon for procurement of the one or more products or services.

The program can further include instructions for updating an item master database to obtain an updated item master database based on the BPA. The program can further include instructions for reallocating the BPA from the buyer to a reallocated buyer. The one or more supply terms can include a payment plan. The program can further include instructions for receiving a part history for the one or more products or services. The part history can include one or more superceded part prices. The program can further include instructions for searching the part history for the one or more superceded part prices. The BPA includes one or more plant-specific prices and one or more price effective dates.

The above embodiments and other embodiments, features, and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood with reference to the following description, taken in connection with the accompanying drawings:.

FIG. 6 is a GUI for displaying a price break extension from;

FIG. 7 is a GUI for displaying a superceded chain of parts;

FIG. 8 is a graphical user interface (GUI) of a blanket order with the option to access a blanket extension form;

FIG. 10 is a GUI for implementing a customized coverage group entry and maintenance form; and FIG. 11 is a GUI for displaying an indirect blanket extension.

DETAILED DESCRIPTION OF EMBODIMENTS OF THE PRESENT INVENTION

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ the present invention.

Global Purchasing Environment Overview

Figure 1A:
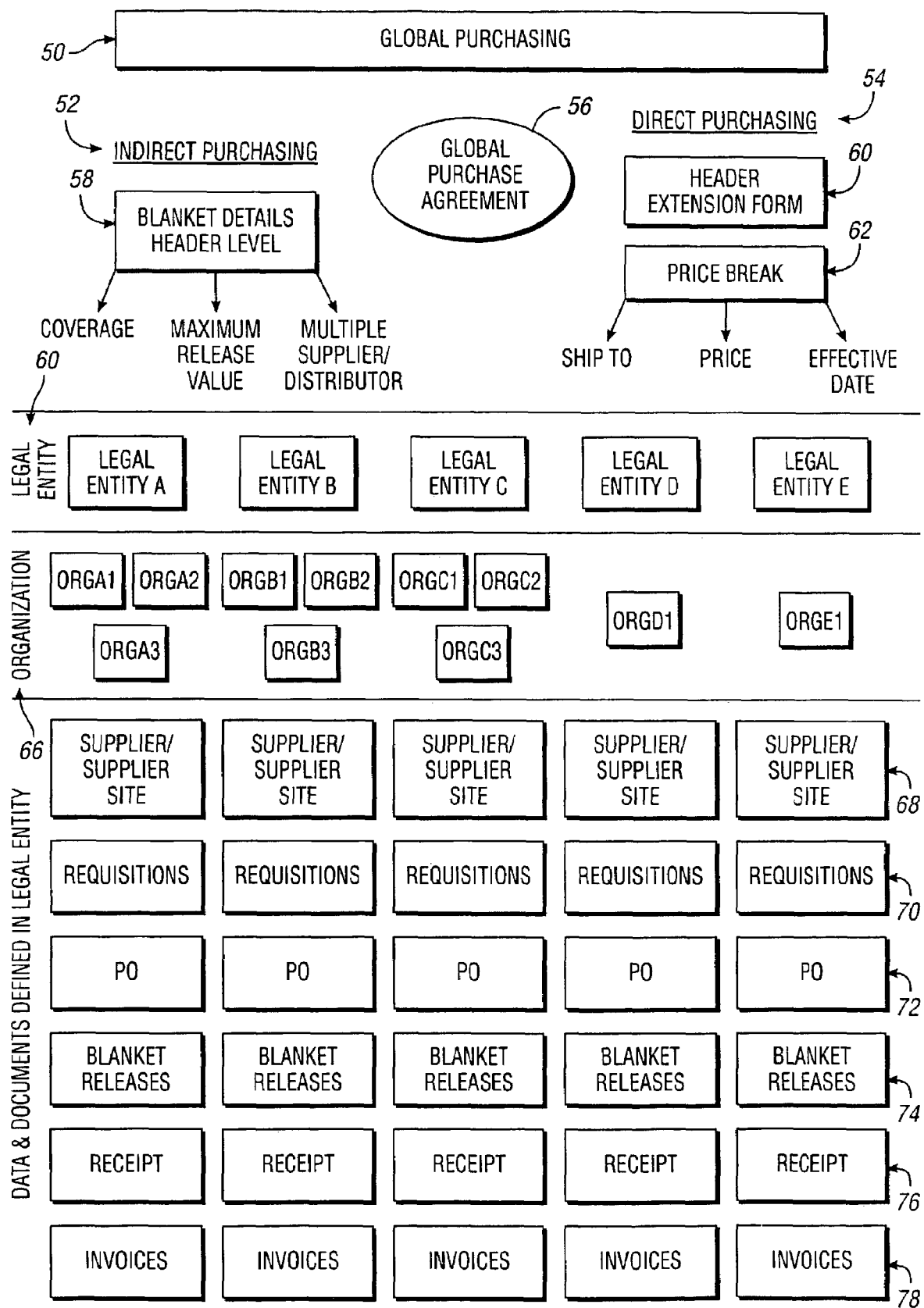
FIG. 1A is a block flow diagram illustrating an overview of the global purchasing environment.

FIG. 1A is a block flow diagram illustrating an overview of the global purchasing environment. The content and arrangement of objects illustrated in FIG. 1A can be rearranged, modified or omitted to best fit a particular implementation.

Global purchasing environment 50 is comprised of indirect purchasing 52 and direct purchasing 54, which both utilize global blanket purchase agreements 56. Agreements 56 include the ability to create a single blanket for multiple legal entities.

Block 58 represents how agreements 56 are implemented according to indirect purchasing 52. Blanket details header level means that information at the header level is applied to all blanket lines and a buyer does not need to specify by line item. Agreements 56, as applied to indirect purchasing 52 can also include coverage, maximum release value, and multiple supplier/distributor. Coverage describes the plants or non-manufacturing locations that can release against the blanket order. Maximum release value describes releases that exceed the value are routed to the buyer. Multiple supplier/distributor identifies suppliers for each organization covered by each agreement 56.

Blocks 60 and 62 represent how agreements 56 are implemented according to direct purchasing 54. The header extension form identified legal entities covered on blankets as well as delivery and payment terms for each legal entity. The price break includes information at the line item level, which can include but is not limited to ship to, price and effective date. Ship to information includes payment terms and conditions. Price can include different prices for single line items based on ship to including price history. Effective dates can support effective dates for pricing at the line item level.

Legal entities 64 can be defined in the global purchasing environment. Legal entities A, B, C, D and E depict examples of legal entities operating in the global purchasing environment. Organizations 66 can also be defined in the global purchasing environment. In certain embodiments, organizations 66 are assigned to one of the legal entities 64. Org. A1, A2 and A3 are assigned to legal entity A. Org. B1, B2 and B3 are assigned to legal entity B. Org. C1, C2 and C3 are assigned to legal entity C. Org. D1 is assigned to legal entity D. Org. E1 is assigned to legal entity E.

Data and documents can be defined in each legal entity, which can include, but is not limited to, supplier/supplier site 68, requisitions 70, purchase order 72, blanket releases 74, receipts 76 and invoices 78. As applied to indirect purchasing 52, requisitions 70 enable requisitioners to search blankets in global purchasing environment. Purchase order 72 and blanket releases 74 apply to indirect purchasing 52.

Direct Materials Process Overview

Figure 1B:
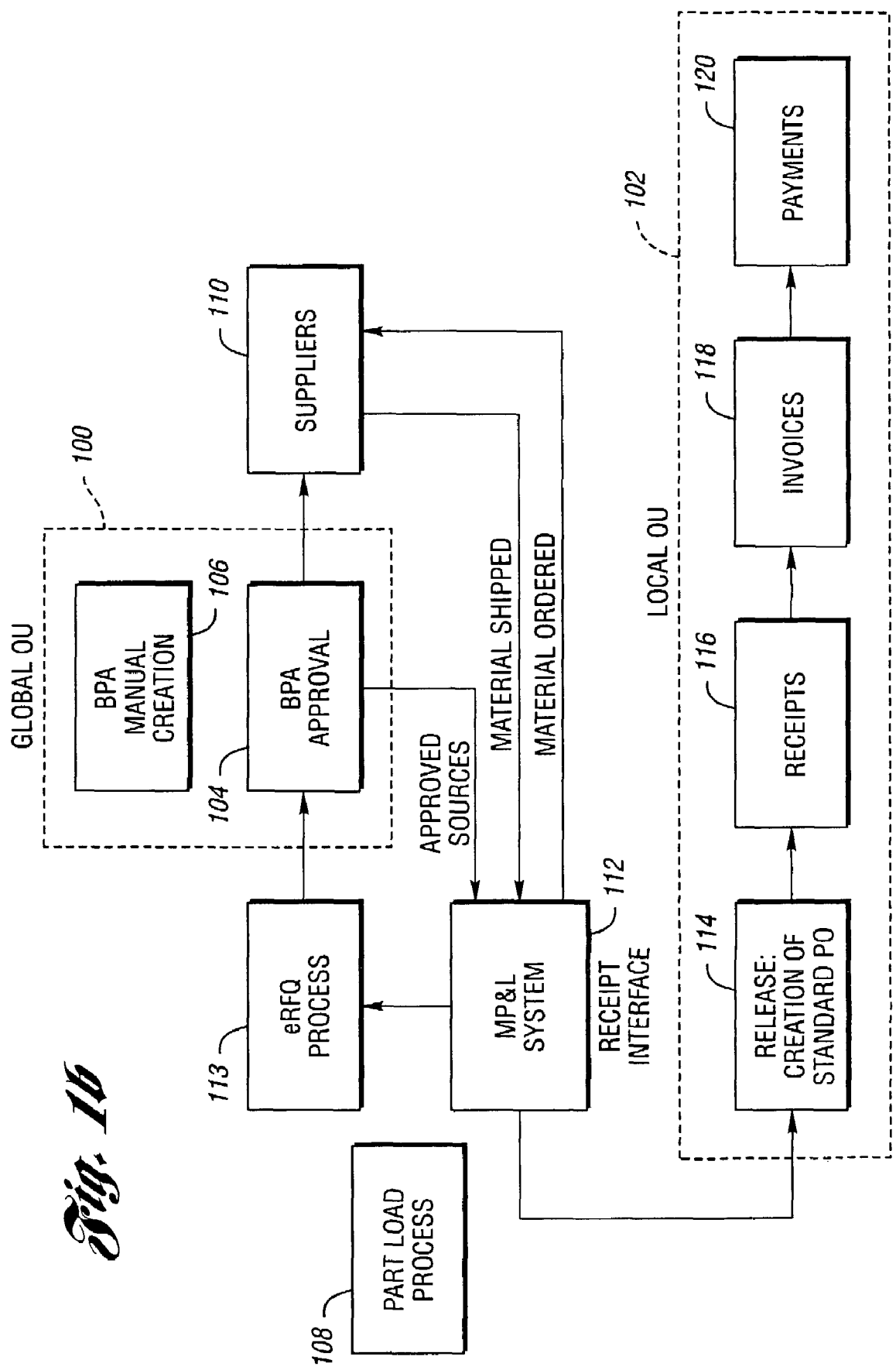
FIG. 1B is a block flow diagram illustrating an overview of a direct materials process.

FIG. 1B is a block flow diagram illustrating an overview of a direct materials process. The content and arrangement of objects illustrated in FIG. 1B can be rearranged, modified or omitted to best fit a particular implementation.

The direct materials process contains two major operating units (OUs), global OU 100 and local OU 102. Global OU 100 is comprised of blanket purchase agreement (BPA) approval 104 and BPA manual creation 106. It is understood that BPAs are also referred to in this document as "blankets". BPA manual creation 106 gives a buyer the ability to manually enter BPAs and submit the BPA for approval. The eRFQ process 106 can create BPAs with information supplied by the Part Load Process 108.

Once the BPA is approved, the BPA is sent to suppliers 110 having the capability of supplying the direct materials on the buyer's terms. These suppliers are commonly referred to as approved sources. The approved sources list can be supplied to a material planning and logistics (MP&L) system 112. The MP&L system also receives materials shipped information from the approved sources. The MP&L system uses the approved sources list and the materials shipped information to produce materials ordered information and a materials receipt. The materials ordered information is sent to the approved sources for further processing.

MP&L system 112 can transmit information for use in eRFQ process 113. In turn, information is transmitted to BPA approval 104 based on eRFQ process 113.

The materials receipt is sent to the local OU 102. The local OU 102 is comprised of the following functions: release 114, receipts 116, invoices 118, and payments 120. The materials receipt is first processed by the release function 114 in order to create a standard purchase order. Subsequently, the materials receipt is processed through the receipts 116, invoices 118, and payment functions 120.

Figure 2:
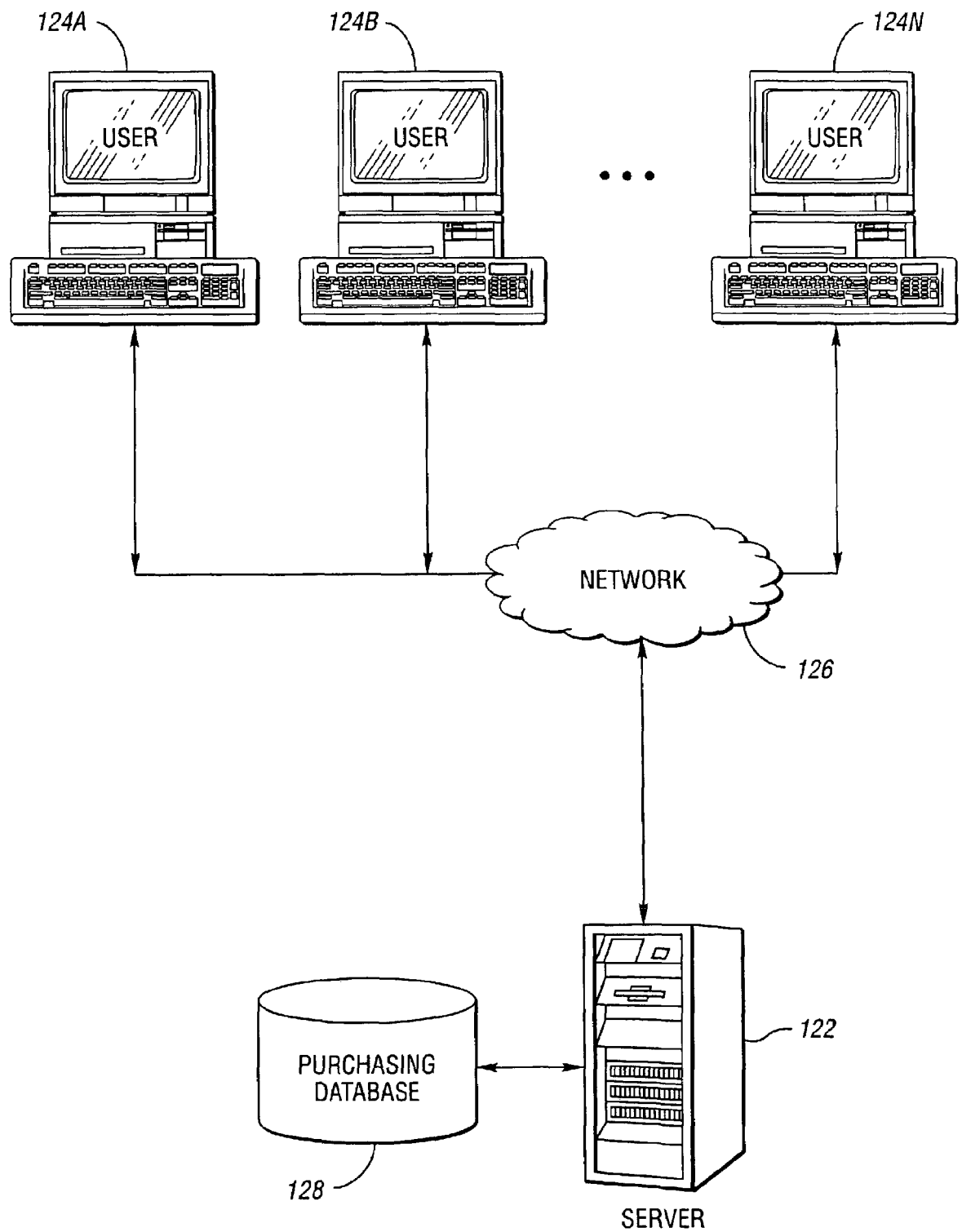
FIG. 2 depicts a schematic diagram illustrating a system embodiment for implementing certain methods of the present invention.

FIG. 2 depicts a schematic diagram illustrating a system embodiment for implementing certain embodiments of the present invention. It should be understood that the diagram can be modified, rearranged, deleted, added upon, or amplified based on a particular embodiment of the present invention.

FIG. 2 illustrates an at least one server computer 122 operably serving a plurality of client computers 124A-N, which can communicate with server computer 122 utilizing a TCP-IP communication protocol via network/LAN 126. Server computer 122 can be configured to operably store data to, and retrieve information from, at least one purchasing database 128.

Direct Materials Global BPA Tool

The direct materials global BPA tool includes an ability to create an item master, which defines all items at the global OU level. An engineering system is preferably used to input item information into the item master.

The direct materials global BPA tool includes an ability to create BPAs. The BPA can include different prices, otherwise referred to as price breaks, for multiple production plants, otherwise referred to as ship-to locations, spanning across multiple legal entities, such as national companies or OUs.

A method of creating BPAs includes using a "eRFQ Tool". This method includes the ability of specifying multiple ship-to locations that can span across multiple OU boundaries. The "eRFQ Tool" can be customized to default the terms and conditions for each of the associated OUs and also capture any price break details in the BPA. A custom data structure is developed to afford this ability within the "eRFQ Tool".

Another method of creating BPAs includes creating BPAs manually using forms. Manual entry of the BPA includes entering and maintaining all of the OUs enabled for the BPA. Additionally, manual entry can be customized to allow defaulting of payment terms and conditions related to the OU. The manual entry method can include the ability to allow the buyer to enter additional price break details on the BPA, including multiple ship-to locations and multiple prices by effective dates.

Another method of creating BPAs includes using Part Load Process, otherwise referred to as the Roll of Price. Preferably, when the Part Load Process receives a request for a Superceding Part from the production plant, the Part Load Process creates a BPA for the Superceding Part by copying all the details from the BPA for the Superceded Part. The Part Load Process can be customized to allow the user to specify the same multiple ship-to locations that were enabled for the existing Superceded Part BPA. The Part Load Process can be customized to populate price break details on the BPA and to create a BPA with a Prototype type for the Superseding Part.

The direct materials global BPA tool includes an ability to update the BPA. Several methods for updating BPAs are contemplated.

One method of BPA updating includes a manual updating method. The business functionality for supporting manual updates includes, but is not limited to, the following: (1) only the buyer responsible for the BPA can make updates, (2) all other buyers should be allowed to only view the details of the BPA, (3) buyers should be able to view either all the price changes to the part or only the effective prices for the part, (4) the buyer can change the price or its "effectivity date" or add a new price with a new "effectivity date", (5) restrict the part prices from being adjusted below the sum of all associated material indices, (6) the price history should be maintained when part prices are changed, (7) buyers have the ability to add or disable OUs on the BPAs, and (8) buyers have the ability to add ship-to locations to the BPA.

Another method of BPA updating includes using the Part Load Process. When the Part Load Process receives a request from a plant for an item on an existing BPA, the Part Load Process can update the BPA. In addition, the Part Load Process should have the ability of adding OUs and the associate details to the BPA. The Part Load Process should have the ability of adding the ship-to location and other details, including the price of the BPA.

Another method of BPA updating includes using Non-Design Price Changes ("NDPC") updates. The NDPC process can be modified to make price updates to the BPA when a claim is approved. In order to make these changes, NDPC should have the ability to maintain a complete history of all applied NDPC price changes. The part prices should be restricted from being adjusted to below the sum of all associated material indices.

Another method of BPA updating includes using Auto-Material Updates. Auto-Material Updates refer to updates made to the material indices, which affect the part prices on the BPA. The Auto-Material Update process can update the part prices on the BPA with effective dates and to update the part prices using the same method as NDPC updates. The part prices can be restricted from being adjusted to below the sum of all associated material indices.

Another method of BPA updating includes using the eRFQ process to update a BPA for "Re-Sourcing".

The direct materials global BPA tool includes an ability to handle mass buyer reallocation. When a buyer leaves the organization, the buyer transfers purchasing responsibility to other buyers. The BPAs owned by the leaving buyer are reassigned to other buyers taking over the leaving buyer's responsibilities.

The direct materials BPA tool includes an ability to eliminate BPA merging when a buyer is assigned the responsibilities of another buyer. The buyer has the ability to manually close out existing BPAs and open new BPAs in order to consolidate the BPAs.

The direct materials BPA tool includes Consolidator Plants functionality. Consolidator Plants refer to plants that consolidate the requirements from multiple plants and send the consolidated order to the supplier. The supplier can supply the total quantity ordered to the Consolidator Plant when the receiving is done. The Consolidator Plant splits the quantity received and supplies the same to the different Target Plants.

The direct materials BPA tool includes an ability to prevent buyers from working in more than one responsibility at a time. Buyers change responsibilities before creating a BPA in another OU.

The direct materials BPA tool includes an ability to create a global BPA. The buyer has the ability to create BPAs for multiple ship-to-locations spanning across multiple legal entities and to specify OU specific information, i.e. payment terms, etc. The buyer has the ability to create multiple BPAs for the same part.

The direct materials BPA tool includes an ability to add new items to existing BPAs.

The direct materials BPA tool includes functionality for informing the MP&L system through the Sourcing Response process that an item has been sourced once the buyer adds items to an existing BPA.

The direct materials BPA tool includes an ability to specify different prices for different plants for the same item from the same supplier. The buyer has the ability to change price effectivity dates or add a new price with new effectivity dates at the plant level.

The direct materials BPA tool includes an ability to maintain the history when any of the following values change: plant specific prices, price effectivity dates or supplier sourcing percentage.

The direct materials BPA tool includes an ability to create multiple supplier ship-from locations. Items can be shipped to different plants from different supplier ship-from locations. In some rare cases where the plant needs multiple ship-from locations, a buyer has the ability to create a separate BPA.

The direct materials BPA tool includes an ability to differentiate BPAs using Interim Prices. The buyer has the ability to uniquely identify the BPA as Interim. This identification is important to downstream processes, i.e., NDPC, Part Load Process, and receiving interfaces.

The direct materials BPA tool includes an ability to uniquely identify PO Usage Type. PO Usage Type can be identified for direct material usages required for other downstream processes, such as DM Production, DM Prototype, DM Production Tooling, or DM Prototype Tooling. The buyer also has the ability to add other categories, i.e., services and packaging.

The direct materials BPA tool includes an ability to create a BPA reference number for a standard purchase order. For a queried standard purchase order, a BPA reference number can be displayed, indicating against which BPA the standard purchase order was created.

The direct materials BPA tool includes an ability to define unique payment terms for each OU.

The direct materials BPA tool includes an ability to kick off approvals if any of the following change: plant specific prices, price effectivity dates and supplier sourcing percentage.

The direct materials BPA tool includes an ability for buyers to search the part history price to look for superceded part prices.

The direct materials BPA tool includes an ability for the Part Load Process to copy and create a new BPA from an existing BPA in the case of a prototype superseded part or an addition of a new plant to the existing BPA. The Part Load Process has the ability to copy the price and associated details.

The direct materials BPA tool includes an ability for NDPC to change prices or effectivity dates. NDPC is customized to have the ability to affect mass price changes automatically by adding new prices to existing BPAs based on effectivity dates.

The direct materials BPA tool includes an ability to restrict the plant price from being adjusted to below the auto material index price, otherwise referred to as the floor price.

The direct materials BPA tool includes an ability to notify suppliers when a BPA is amended, either by the buyer or by another process, such as NDPC or Part Load Process.

The direct materials BPA tool includes functionality to trigger supplier communication.

The direct materials BPA tool includes an ability to allow for retroactive price changes when a plant or price effectivity changes in the past.

The direct materials BPA tool includes an ability to provide BPA details to a supplier portal.

The direct materials BPA tool includes an ability to migrate to an Oracle GPO solution, if available.

The direct materials BPA tool includes an ability to add data elements to support the tool order process. Tooling orders can be associated with a BPA having one of the appropriate Tooling Types selected from the list of values available in the PO Type descriptive flex field (DFF) on the Header Extension Form. This association allows buyers to select the alternative region on the Location Extension Form and add or modify the relevant details for Tool Orders. The buyer should have the ability of creating new BPAs manually for Tool Order or update and/or modify an existing Tooling BPA created and/or owned by the buyer through these forms. When the BPA is submitted for approval, the approval workflow has the ability to differentiate treatment for Tool Orders and call the custom Finance Approval Workflow for further special processing required for Tooling BPAs.

The direct materials BPA tool includes an ability to differentiate between direct materials and indirect materials purchasing.

The direct materials BPA tool includes an ability to re-use common components when differentiating between direct and indirect purchasing, in order to promote seamless user experience for the buyer.

Indirect Materials Global BPA Tool Functionality

The indirect materials global BPA tool includes an ability to define coverage groups for plants or facilities that use the same BPA. This operation can be performed on a separate form accessible by persons holding designated responsibilities.

The indirect materials global BPA tool includes an ability to assign BPA coverage groups which indicate the plants and facilities belonging to the coverage groups.

The indirect materials global BPA tool includes the ability for the buyer to create extensions based on a coverage group. After selecting a coverage group, the buyer can selectively delete at least one plant and/or facility or at least one plant and/or facility from the BPA coverage.

The indirect materials global BPA tool includes an ability to modify a coverage group displayed on the blanket header. This tool can also indicate that the coverage group has been modified for the BPA.

The indirect materials global BPA tool includes an ability to add a plant or facility to a coverage group. The added plant or facility is allowed to use BPAs based on the coverage definition.

The indirect materials global BPA tool includes an ability to provide a notification to the buyer when a coverage group change affects a BPA belonging to the buyer. The buyer can open the BPA from the notification to facilitate review of the BPA coverage and supplier and/or plant relationship.

The indirect materials global BPA tool includes an ability to remove a plant or facility from a coverage group which can immediately prevent further use of the BPA by the plant or facility.

The indirect materials global BPA tool includes an ability to complete in process activity against a blanket despite removal of the plant or facility from the coverage group. This includes processing receipts, payments, and returns for existing and approved releases. This ability includes restricting the creation of new releases. Additionally, incomplete and in-process releases can be moved to the buyer's work lists for buyer intervention.

The indirect materials global BPA tool includes an ability to include inventory organization belonging to multiple operating units in a coverage group. In essence, the coverage group is not restricted by operating unit.

The indirect materials global BPA tool includes an ability to select multiple supplier sites on a single BPA. Supplier sites can be selected across operating units.

The indirect materials global BPA tool includes an ability to designate a supplier and supplier site for each inventory organization selected in a coverage.

The indirect materials global BPA tool includes an ability to provide a list of values for supplier, site, and contact which is OU specific, based on the inventory organization designed in the coverage.

The indirect materials global BPA tool includes an ability to allow users to release against a blanket order while the blanket is in "requires reapproval" status. Releases are available against the last approved revision. New lines and prices included in the revision requiring reapproval are not picked up on releases.

The indirect materials global BPA tool includes an ability to select a default supplier and supplier site at the header of the BPA.

The indirect materials global BPA tool includes an ability for an inventory organization which does not have a specified supplier and supplier site to use the supplier and supplier site on the blanket header. Alternatively, the inventory organization can use an equivalent supplier, site, and contact for the OU which corresponds to the inventory organization.

The indirect materials global BPA tool includes an ability to populate the coverage form with the OU specific supplier, site, and contact which corresponds to the values provided on the header when no other value is specified in the coverage form.

The indirect materials global BPA tool includes an ability for a supplier site relationship to include sites from multiple suppliers, such as several distributors of the same manufacturer's products.

The indirect materials global BPA tool includes an ability to use distributors on multiple BPAs. For example, the distributor could be a distributor for several manufacturers' parts.

The indirect materials global BPA tool includes an ability to enter a renewal indicator at the blanket header.

The indirect materials global BPA tool includes an ability to automatically renew a blanket with renewal indicator flag on demand.

The indirect materials global BPA tool includes an ability to view the BPAs regardless of operating unit origin.

The indirect materials global BPA tool includes an ability to view all activities against a BPA regardless of the OU.

The indirect materials global BPA tool includes the ability for a buyer to indicate a maximum release value. Releases that exceed the release value set by the buyer are forwarded to purchasing to be reviewed and approved.

The indirect materials global BPA tool includes the ability to validate against the blanket order after the last release approval. If the blanket has been cancelled or has expired between the creation of the release and the approval, the release is forwarded to the buyer to be issued.

The indirect material global BPA tool includes the ability to create blanket lines from catalogs.

The indirect materials global BPA tool includes an ability to search data based on blanket number which is associated with a standard PO when a standard PO is used as the release document.

Implementation of the Direct Materials Global BPA Tools

A system of implementing the direct materials global BPA tool functionality includes developing customized components that are compatible with the existing oracle Purchasing Module.

Figure 3:
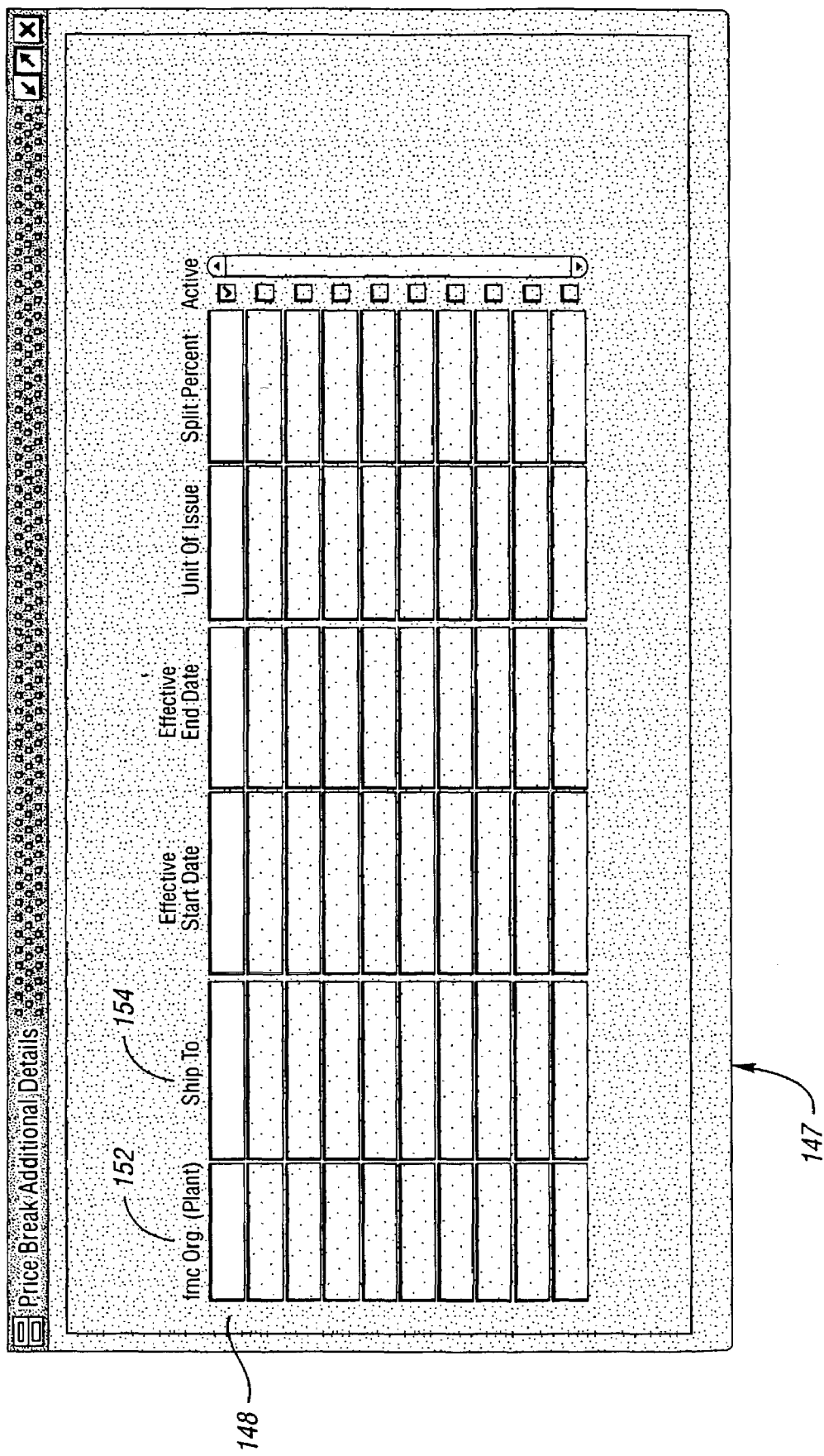
FIG. 3 is a GUI for allowing buyers to enter direct material purchase order usage type.

As illustrated in FIG. 3, GUI 136 can be displayed to allow the buyer to enter the "DM PO Usage Type". This DFF can automatically populate BPAs created by eRFQ and the Part Load Process.

Figure 4:
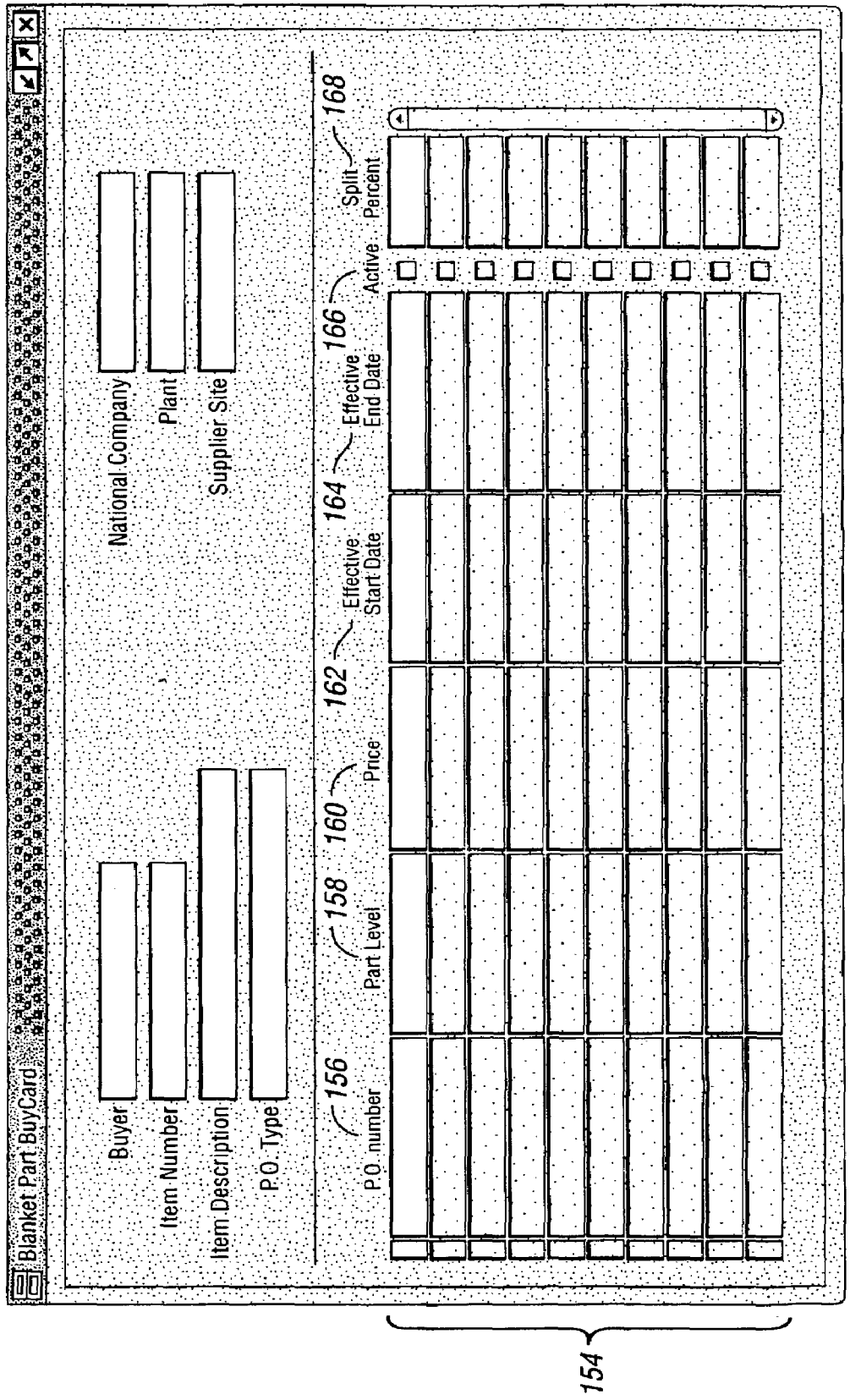
FIG. 4 is a GUI for allowing the buyer to select a line type.

As depicted in FIG. 4, GUI 138 allows the buyer to select a line type. The line types are useful in controlling the routing and approval of the BPA and for processing "prototype receipts" and "production receipts". Non-limiting examples of line types include, but are not limited to, APN goods, APN services, goods, rate, safety goods, service and tooling. If the Part Load Process creates a new BPA for a superceded part, the value is populated within this DFF.

If the "Type" field on the blanket extension is "Blanket Purchase Agreement", then the "PO Function" DFF stores an "Interim Flag" as "Yes" or "No". An "Interim Flag" value of "Yes" indicates that the buyer is only establishing a BPA with an "Interim Price" and further work is needed to finalize the price.

According to a system for implementing the direct materials global BPA tool functionality, a "BPA Header Extension Form" can be created within the oracle Purchasing Module. The "BPA Header Extension Form" allows the buyer to specify all the OUs that should be enabled for the BPA. This form can be supported by a custom table that will hold data related to multiple OUs, otherwise referred to as national companies, for which the BPA is valid. The buyer has the ability to enable or disable OUs from the BPA.

The "BPA Header Extension Form" can provide the ability to associate the terms and conditions defined for the OU. The applicable defaulting rules will be used to derive payment terms, FOB and freight for each of the OUs. The buyer preferably has the ability to override the payment terms, FOB or Freight conditions on each of the Ous.

Figure 5:
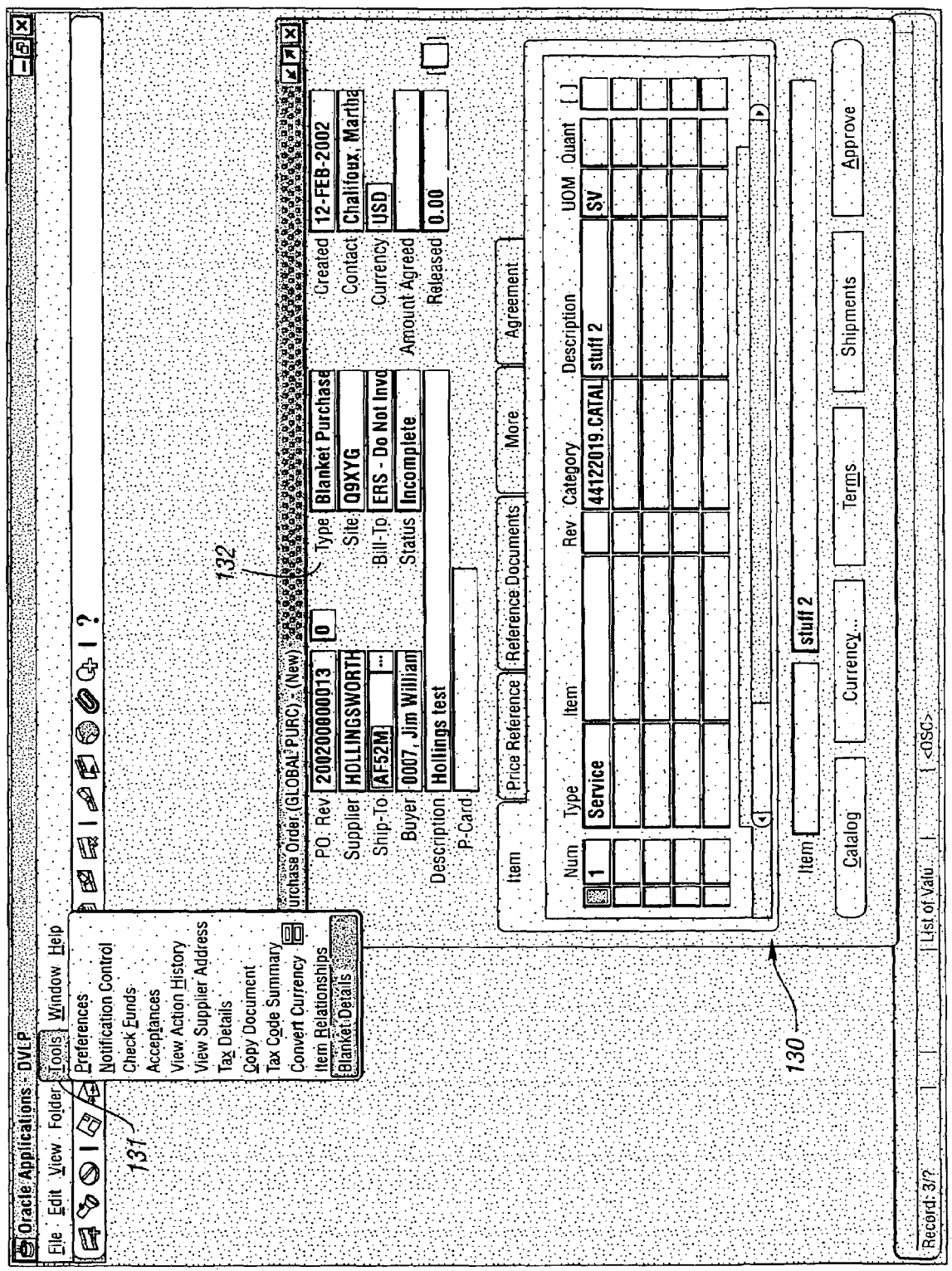
FIG. 5 is a GUI for displaying a BPA header extension form.

The "BPA Header Extension Form" is depicted as a GUI in FIG. 5. The form includes a plurality of operating unit input fields 140, a plurality of supplier site input fields 142, a plurality of payment term input fields 144, and Save button 146 for saving the data entered in input fields 140, 142, and 144.

The custom table for supporting the "BPA Header Extension Form" can store the following data elements: BPA Header, Supplier Site, Operating Unit, Payment Terms, FOB and Freight.

Figure 6:
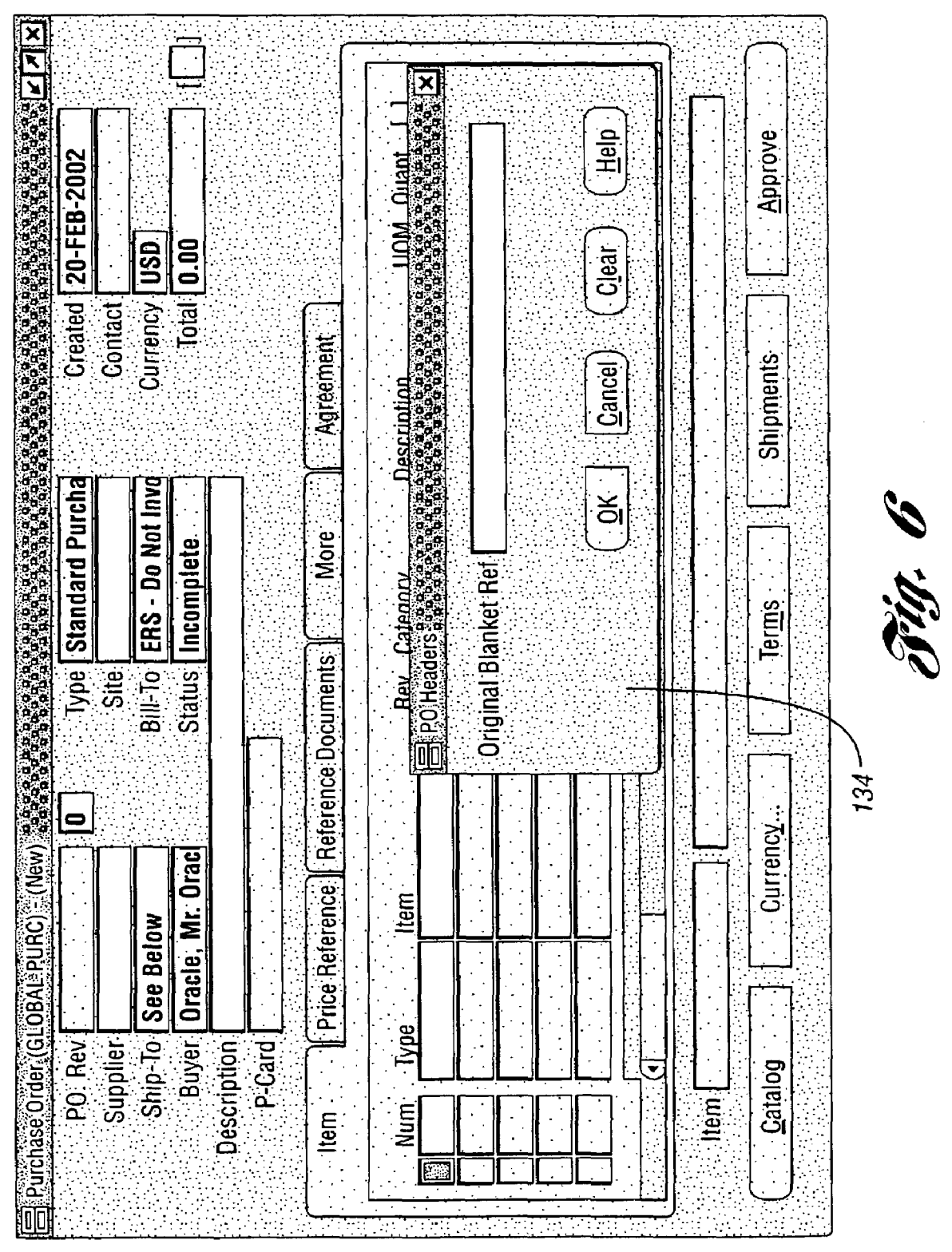

According to a system for implementing the direct materials global BPA tool functionality, a "Price Break Extension Form" can be created within the Oracle Purchasing Module. A GUI displaying the "Price Break Extension Form" is depicted in FIG. 6. The "Price Break Extension Form" can store "Price Break" information 147, otherwise referring to plant level variations in item prices, on the BPA. Other "Price Break" information can include supplier ship-from, consolidation center, quantity and unit price. A custom table can store this information at the line level. Based on the profile option set up at the responsibility level, the buyer preferably selects the "Price Break Extension" from the "Tools Menu" on the BPA and zooms to the "Price Break Extension Form". The form allows only the responsible buyer to make updates and other buyers can only view the information.

The buyer can specify "part prices" with "effectivity dates", in addition to plant level details, such as pack price, split percent and unit of issue, for plants associated with the OUs defined in the BPA header. When the OU is selected, the associated supplier site and payment terms details will be automatically populated for the selected OU. Preferably, the dealer has the ability to override the details.

On each price break line 148, the list of inventory organizations 150 and ship-to locations 152 available on the list of values (LOV) can be limited to those valid for the OU's linked to the global BPA and inventory organizations where the item is assigned.

The custom table for supporting the "Price Break Extension Form" can store the following data elements: LINE_LOCATION_ID, PREVIOUS_REVISION NUMBER, INVENTORY_ORGANIZATION_ID, SHIP_TO_ORGANIZATION_ID, UNIT_MEAS_LOOKUP_CODE, SPLIT_PERCENT, LIST_PRICE_PER_UNIT, START_DATE, END_DATE, ACTIVE_FLAG, RFQ_NUMBER, SUPPLIER_SHIP_FROM, and CONSOLIDATION_CENTER_ID. LINE_LOCATION_ID refers to an internal line location ID for the BPA. PREVIOUS_REVISION NUMBER references the previous BPA revision from which the BPA was modified. INVENTORY_ORGANIZATION_ID refers to the inventory organization identification of the OU. SHIP_TO_ORGANIZATION_ID refers to a plant. UNIT_MEAS_LOOKUP_CODE refers to the unit of measure. SPLIT_PERCENT refers to the split percent for the price break. LIST_PRICE_PER_UNIT refers to the item price. START_DATE refers to the effective start date of the price. END_DATE refers to the effective end date of the price. ACTIVE_FLAG refers to a flag to indicate the active record. RFQ_NUMBER refers to a reference to quotation. SUPPLIER_SHIP_FROM refers to supplier ship-from site for the plant.

According to a system for implementing the direct materials global BPA tool functionality, a "Blanket Purchase Agreement View" can be created within the Oracle Purchasing Module. The view can be created by joining standard PO tables with custom BPA extension tables listed in this document. This combination gives a comprehensive de-normalized source of information regarding "BPA details" to downstream users like "Receipts Interface" and "iSupplier Portal". The data elements in the consolidated view include, but are not limited to, the following: PO Header ID, BPA Number, Revision Number, Agent ID, Operating Unit, Payment Terms, FOB, Freight, Vendor ID, Vendor Site ID, PO Line ID, Inventory Item ID, Item Number, Item Description, Item Category, Item Revision, Line Location ID, Quantity, Unit Price, Unit Of Measure, Effective Start Date, Effective End Date, Ship-To Organization ID, Ship-To Location ID, Supplier Split Percent, and Vendor Ship Form.

A "BPA Part Buy Card Viewing Form" can be created within the Oracle Purchasing Module. The "BPA Part Buy Card Viewing Form" preferably allows the buyer to view part price history by superceded chain. Preferably, the form is restricted to inquiries only. As such, the buyer is not allowed to update the part price history. As illustrated in FIG. 7, part price history 154 can be displayed for all the superceded chain of parts. Part price history 154 includes, but is not limited to, PO Number 156, Part Level 158, Price 160, Effective End Date 164, Active Flag 166, and Split Percent 168. The "Superseded" and "Superseding" parts are extracted using the "part link" established in the "Part Load" process. If no part link is found, the "Track Back Logic" will be used to extract all of the linked parts.

Implementation of the Indirect Materials Global BPA Tools

A system of implementing the indirect materials global BPA tool functionality includes developing customized components that are compatible with existing Oracle Purchasing Module.

FIG. 8 is a graphical user interface (GUI) of a blanket order with the option to access a blanket extension form. The buyer works in the global OU responsibility, in the standard purchase order form 130. In this responsibility, only the "Blanket Purchase Agreement" document type is available. The "Blanket Purchase Agreement" document type is selected in "Type" field 132. Other document types can be disabled so that the buyer cannot inadvertently create a standard PO in the global OU.

Three descriptive flex fields (DFFs) can be defined at the header level of the standard Oracle "Purchase Order Form", using attributed from the PO_HEADER_ALL table. These DFFs refer to context sensitive values in the "Document Type" field on the standard "Purchase Order Form".

Figure 9:
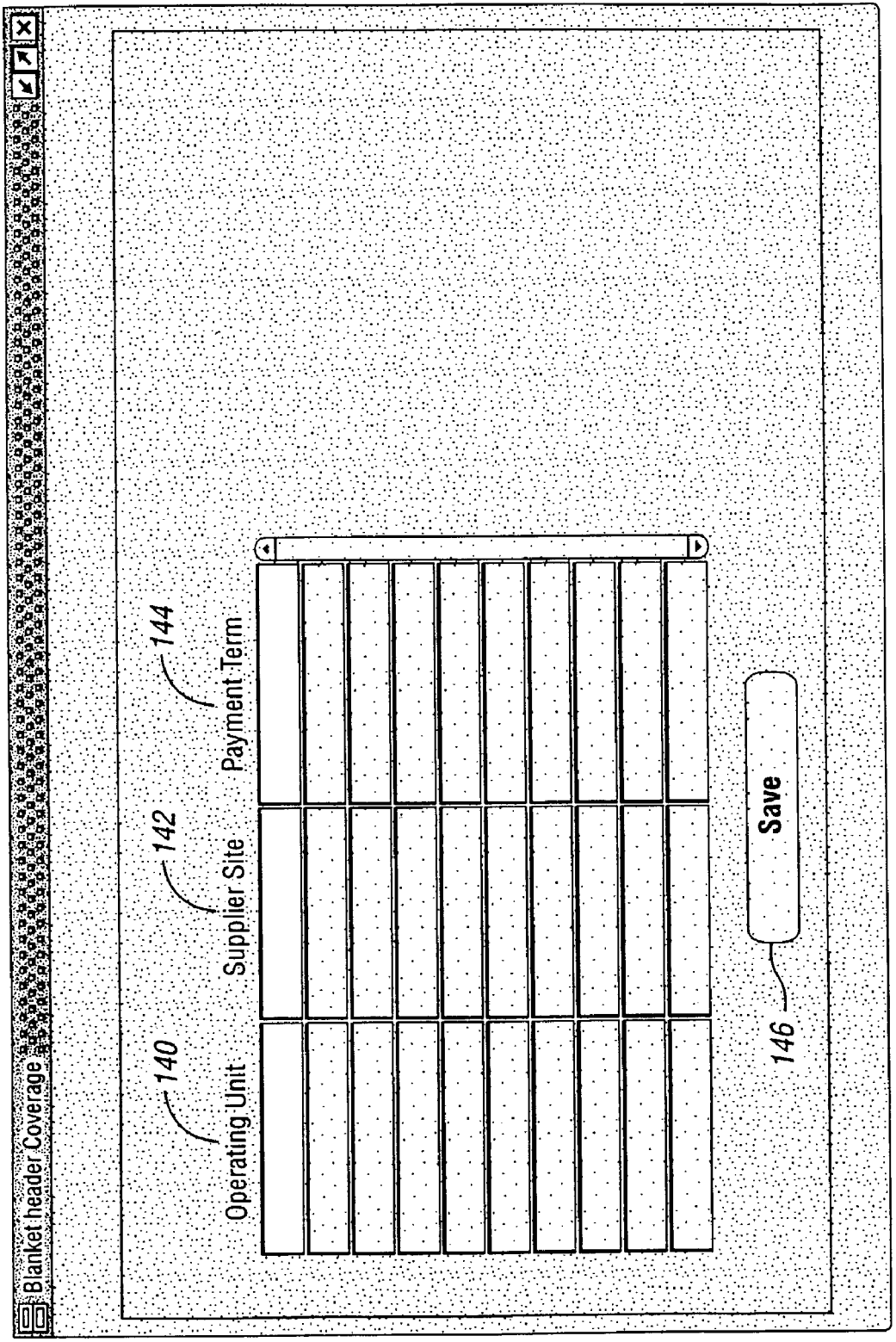
FIG. 9 is a GUI for identifying placement of a blanket number on a release after a requisitioner completes a "find blanket" function.

If the "Type" field 132 is "Standard PO", then the "Original Blanket Reference" DFF stores the BPA number as a reference link. As illustrated in FIG. 9, a GUI 134 for identifying placement of a blanket number on a release after a requisitioner completes a "find blanket" function. If a buyer creates the release, the buyer manually inserts the blanket number. The "Receipts Interface" populates the "BPA Number" when it creates a "Standard PO" locally against an existing global BPA.

If the "Type" field 132 is "Blanket Purchase Agreement", then the "DM PO Usage Type" DFF stores the "DM PO Usage Type".

Figure 10:
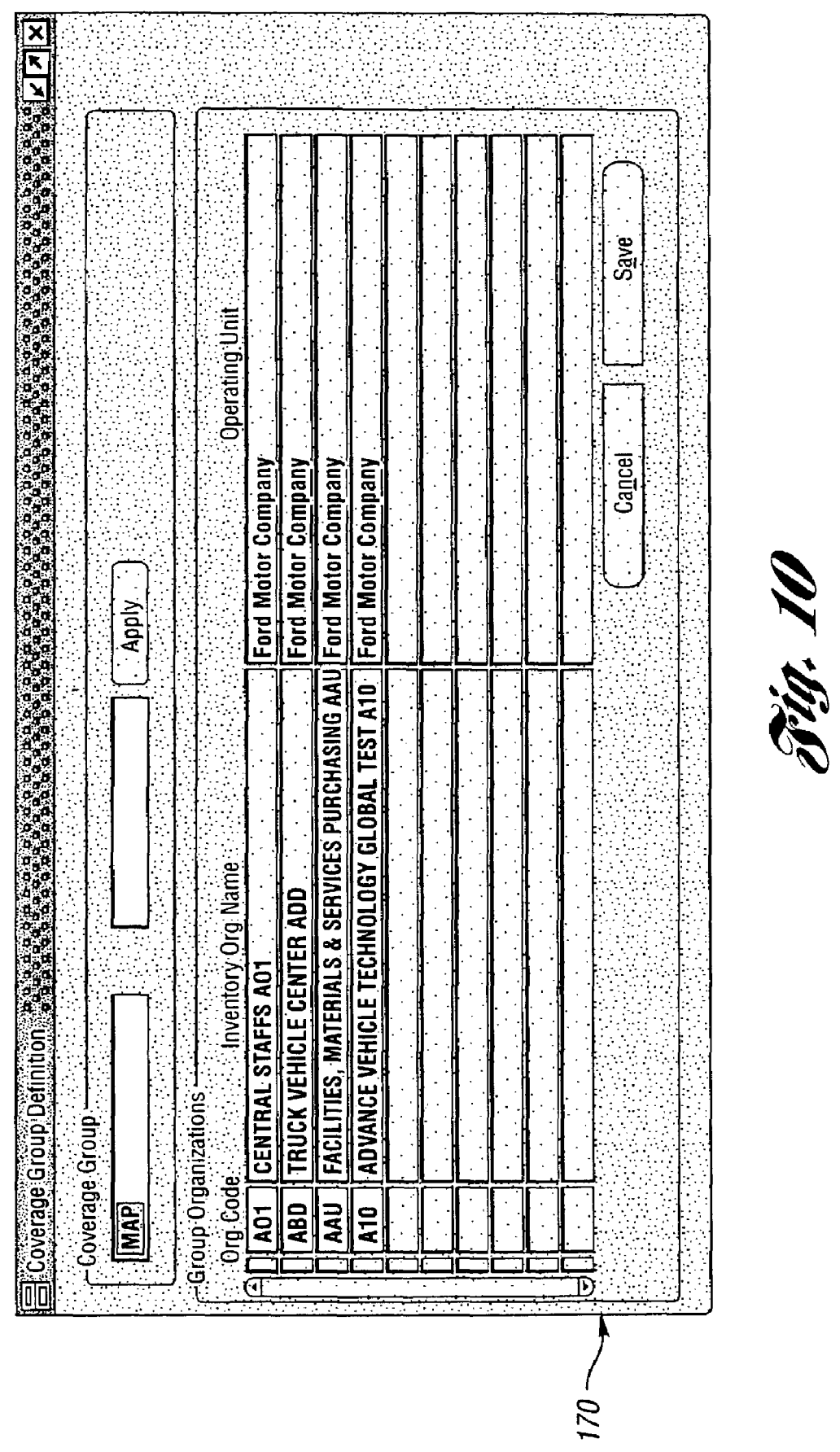

A coverage group entry and maintenance form can be created within the standard Oracle Purchasing Module. FIG. 10 depicts GUI 170 for implementing a customized coverage group entry and maintenance form. This custom form can be supported by a custom data structure. A new grouping of Inventory Organizations can be defined or edited in this form. This form enables a user to add Inventory Organizations to a Coverage Group across Sets of Books or Operating Units. In addition, the form allows the user to delete or disable an inventory organization from the coverage group. Once deleted or disabled, new BPAs using the coverage group do not contain the deleted or disabled inventory organization. BPAs containing the coverage group can be updated to delete or disable the inventory organization. Requisitions and Standard Purchase Order (releases) which have been sourced from the blanket prior to the change to the coverage group are not affected.

For each coverage group change, a notification can be sent to the buyer which lists all BPAs affected by the coverage group change. The buyer has the responsibility to update the supplier relationship when necessary.

A blanket coverage and supplier site relationship form can be created within the standard Oracle Purchasing Module. FIG. 11 illustrates GUI 172 for displaying an indirect blanket extension. This form can be accessed using the zoom under tools menu of the enter purchase order form. This form has the following major features:

A buyer can default the Coverage Group for the BPA based on data created in the Coverage Group Entry and Maintenance Form. Alternatively, a user can manually add or disable Inventory Organizations from this form. A custom table supports the coverage data elements. The Primary key of this table is the PO_HEADER_ID of the Blanket Purchase Blanket Order. If the blanket coverage is defined using a Coverage Group, any updates to the Coverage Group definition can be automatically update the coverage on the blanket.

A buyer can specify a Supplier or Distributor, a Supplier or Distributor Site, and a contact for each Inventory Organization added in the Coverage Region of the form. The supplier can differ from the supplier on the blanket header. Only supplier sites and contacts defined for the operating unit which the inventory organization is linked to can be displayed in the LOV.

A buyer can indicate the Maximum Release Value for the BPA. An optional field can be provided to enter the maximum release value. This field determines whether a requisition may automatically create an approved Purchase Order against a blanket or requires buyer review.

A buyer can indicate auto renewal for the blanket via a checkbox.

A Zoom to Coverage and Supplier Site Relationship Form can be created within the standard Oracle Purchasing Module.

This zoom can be accessed from the Tools Menu of the Enter Purchase Order Form. The zoom is only active for Blanket Purchase Order document type. The target of this zoom can be the Blanket Coverage and Supplier Site Relationship Form.

A search screen for Non Catalog requisitioners finding desired blanket lines to release against is provided. A search screen is provided where the requisitioner can find blanket lines based on criteria entered. The inventory organization is a required criterion. Other optional criteria include category, supplier, blanket number, and description.

The search returns any blanket lines matching the criteria. For blanket lines containing price break lines, the price break lines can be displayed in place of the blanket line. Incomplete, rejected, closed, and cancelled blanket lines are not returned. Blanket lines Pre-approved, in-process, or required re-approval blanket lines that have a blanket revision level greater than zero can be substituted with the earlier version of the line from the PO archive. Consequently, the blanket can be used while being amended.

If a requisition selects a line, the window closes and the blanket line or price break line information is copied onto the requisition line. The system can store the Blanket Line ID in attribute 7 of the requisition line DFF.

A Workflow to Auto-create a Standard PO against a Blanket Purchase Agreement is provided. Once the appropriate Blanket Order is determined, the Workflow can copy the Terms Information from Blanket Purchase Order to the Terms information of a Standard Purchase Order. The balance of the Standard Purchase Order information can be derived from the requisition. Prior to creating the release, the workflow can validate that the blanket has not been closed or cancelled. If the blanket is not open, the requisition is placed in the buyer's worklist. A notification is provided to the requisitioner indicating that the requisition was not automatically released to the supplier as the blanket was no longer valid. The standard PO will be approved automatically.

A DFF on Standard Purchase Order to hold reference to the Parent Blanket Order is provided. A DFF is used on the Standard Purchase Order to hold the Parent Blanket Order Number. The DFF Purchasing Header Attribute15 used with the Original Blanket(s) can be used. The value of this DFF is null for Spot Buy Purchase Order or buyer auto-created Purchase Orders, unless the buyer populates the field. The DFF can be automatically populated for standard Purchase Orders, which are created by the Workflow program.

A Requisition Validation Custom p11 is provided. For requisitions lines sourced from a blanket, a custom p11 is provided for validation of requisition information upon initiating the approval action. The validation includes the following rules: (1) supplier, Supplier Site and contact may not be changed, (2) UOM may not be changed, (3) category may not be changed, (4) quantity entered must correspond to the price break line selected, (5) inventory organization must correspond to the inventory organization included in the blanket coverage, (6) price must not be changed unless price override flag is checked, (7) price override, where allowed, must not exceed the price limit, (8) description should not be changed when the blanket is for an item or for a catalog line, and (9) commodity-only lines shall allow description changes.

If a condition violates an at least one of the rules, a message is provided to the requisitioner indicating the information that should be corrected in order to conform with the rule.

A process to check Maximum Release Value is provided. Prior to creating a release, the create releases process can find all requisition lines sourced from the same blanket and calculate the sum of the value of the lines. If the requisition currency is not the same as the blanket currency, the process uses the Foreign Currency Line Total (FOREIGN_LINE_TOTAL_DSP) in the Currency tab of the requisition line. This sum is compared to the Maximum Release Value for that blanket.

If the sum is less than or equal to the maximum release value, the create releases program can generate the PO. If the sum is greater than the maximum release value, the lines are placed in the requisition pool for the buyer's review and the workflow will send these lines to the buyer's work list for action by the buyer. The work list notification can indicate that the requisition exceeded the Maximum Release Value of Blanket.

The buyer can Auto-create to another supplier, return the requisition lines to the requisitioner, and Auto-create against the original blanket.

A notification is provided to the buyer when a requisition sourced against a blanket does not automatically release due to exceeding the Maximum Release Value. The notification indicates that the requisition exceeded the Maximum Release Value for blanket number n. The notification allows the buyer to open the auto-create form for that requisition. A separate notification is provided to the requisitioner indicating that the requisition was routed to the buyer due to exceeding the maximum release value.

The Purchase Order Approval Workflow is modified to check for the blanket reference on requisition line to determine whether the Standard PO is a release against a blanket, or a spot buy. If the Standard PO is a release against a blanket, the workflow bypasses all approvers and resumes the workflow, changing the PO Status to Approved.

The customized components include global blanket features. A program to update Supplier Site and Contact on Coverage Form can be created within the standard Oracle Purchasing Module. Upon applying and saving the blanket coverage, the program populates the supplier, site, and contact if the buyer has not specified any on the coverage. The program can identify the operating unit of the covered inventory organization. Next, the program can identify the supplier site and contact relevant to the operating unit, which corresponds to the supplier site and contact on the header of the blanket. The supplier, site, and contact can be populated on the coverage form. If the supplier site or contact has not been defined for the operating unit, notification can be sent to the buyer who selected the supplier for coverage, and also to customer service, who is responsible for supplier setup.

A Global Operating Unit can be created for storage of Global Blanket Orders. The default currency of this Operating Unit can be United States dollars. No releases or transactions can be created in the Global Operating Unit.

The Document numbers sequence for Blanket Orders can be sequenced with 2002xxxxxx1. The length of Global Blanket Number can be set to 12 digits.

The Global Blanket Order Number can be stored in the Header Level DFF Attribute 15 of the Purchase Order, which is already defined for Original Blanket(s). Therefore, the global blanket order number is referenced on local releases.

A terms and conditions replication program is provided for ensuring that the Terms and Conditions in a Global Operating Units are synchronized with Terms and Conditions in a local Operating Unit.

The following Terms and Conditions can be replicated across Operating Units: payment terms, freight carrier, and FOB.

Referencing of Global Blanket Order Terms and Conditions on Local Releases (Standard PO's) is provided. The Create Releases workflow can copy the header level Terms and Conditions of the Global Blanket to the local Standard Purchase Order Header by executing the terms and conditions replication program.

An Inventory Planning Post Processor can be provided. This concurrent program can be registered in a request set with Min-Max Planning or Re-order point planning concurrent request and the Requisition Import Concurrent Request. Upon completion of the Min-Max Planning request, it populates the Requisition Import Interface with following information: Item, organization, Ship to location and quantity. The Post Processor Program can update these records with a Supplier, Supplier Site and a Blanket Order Number Reference. This information can be derived from the Global ASL table. The SUPPLIER_SITE_ID for the Local OU (the OU where the requisition originates) can be derived by the Post Processor from the Supplier Site Name in the local OU. the Supplier Site replication program works continuously.

On running the Requisition Import Concurrent Request, an approved requisition can be created with a valid, supplier, supplier site and a Blanket Order reference. The PO document create workflow can create a Standard Purchase Order Release for the requisition, against the referenced Blanket Order.

An item- blanket-organization linkage on the Approved Supplier List (ASL) is provided. The Item-Organization-Blanket number linkage can be stored in a custom ASL forms/tables. The ASL form can be modified with following features:

Organizations should be accessible across Sets of Books.

The Blanket Agreement should be accessible across Operating Units and Sets of Books.

A DFF is provided to indicate if the Supplier and Supplier site for a particular Item is a commodity management supplier (CMS).

A process of releasing against CMS Blanket Orders is provided. The CMS indicator can be maintained on the ASL record. In case there are multiple ASL associations for a particular Item/Org combination and one of the ASL records has a CMS indicator, the Inventory Planning post-processor can pick the CMS Supplier Blanket.

A process of releasing against multiple non CMS blanket orders for the same Item/Org Combo is provided. In case there are multiple ASL records for the same Item/Org Combination, the Inventory Planning post-processor can compare the Blanket lines with the same UOM as requisition and select the Blanket Line with the lowest price.

Inventory Items can be replicated across all Item Validation Organizations. This process can enable Global Blanket Orders and items to be shared across sets of books.

Catalog data can be imported as Blanket Order Lines using the Purchasing Documents Open Interface. Blanket Order lines can be loaded into the Unified Catalog, using the Catalog extractor tool, provided in the Core Applications. This functionality can enable the following functionality for catalogs: price break functionality and multiple prices for the same Supplier Item/UOM combination in the same Legal Entity.

The customized components include Blanket Amendments features. To allow releases against blankets when amendments are in process, the following processes are used:

Release against a blanket order while the blanket is in "requires reapproval" status. Releases are available against the last approved revision. New lines and prices included in the revision requiring reapproval are not picked up on the releases.

A process of Release against an unapproved agreement while a new revision is in process is provided. When the requisitioner uses the 'Find Blankets' feature, the search finds blanket lines which require re-approval, are pre-approved, or are in-process. When these blanket lines have a blanket revision level greater than zero, the earlier version of the line from the PO archive can be displayed. In addition to approved blanket lines, the create releases program can substitute earlier versions of lines from the PO archive when the blanket line which require re-approval, are pre-approved, or are in-process and when the blanket revision level is greater than zero. Catalog changes are handled through the price file review and approval process. Once the price file is approved, the changes can be made to the blanket. In such case, the blankets are available during the approval process.

The customized components allow multiple amendments, otherwise referred to as blanket revisions, to be in process simultaneously. Future effective date of amendments, and future dated cancellations are allowed.

The customized components have the ability to change Supplier and/or Supplier Site. For example, this process is necessary when a company buys another company. Changes to supplier and supplier site on a blanket due to mergers and acquisitions are handled by the Supplier Merge functionality provided by Oracle Payable/Oracle Purchasing.

A customized Viewing Blanket Summary and Release Form is provided and can be created within the standard Oracle Purchasing Module.

A customized form to View Releases Across Operating Units is provided.

The View Blanket Summary and Release Form can be created to view all Blanket Orders and standard POs referencing it across Operating Units. A running total of the dollar values released against the Blanket Order can also be displayed in this Form. An operating unit's blankets can be excluded from view of other users.

A Process to Calculate Amount Released on Blanket is provided. This process keeps a running total of the value of all standard PO releases against a blanket. The value is based on the currency of the blanket. The process can update the Amount Release field on the blanket and release summary form.

A required field is provided on the Coverage and Supplier/Plant Relationship form, attached to the Blanket Order header, to capture whether the Blanket Purchase Order is Renewable (Y) or not renewable (N).

A Concurrent Program for Blanket Purchase Order Renewal is provided that automatically renews all Blanket Purchase Orders with a renewable Flag (Y). A specific Blanket Order Number or a Supplier and a Supplier Site can be specified as parameters in this form. A duration parameter can be used as input by the user.

This concurrent program can automatically extend the effective Expiration Date of the Blanket Purchase Order with the Specified duration. The expiration change can be made without incrementing the revision or requiring reapproval of the blanket.

If blanket renewal is indicated, a notification can be provided to the buyer to indicate that the blanket expiration date will be incremented by one year automatically, unless the buyer changes the renewal indicator. The notification can be provided based on the notification controls established by the buyer.

While the best mode for carrying out the invention has been described in detail, those familiar with the art to which this invention relates will recognize various alternative designs and embodiments for practicing the invention as defined by the following claims.

What is claimed:

1. A computer-implemented method for creating electronic blanket purchase agreements in a manufacturing enterprise, the method comprising:
   identifying one or more products or services needed for a first and second location, the first location operating in a first legal entity and the second location operating in a second legal entity;
   identifying one or more suppliers having the capability of delivering the one or more products or services to the first and second locations; and
   creating an electronic blanket purchase agreement (BPA) embedded in a computer database, the BPA including descriptions for the one or more products or services needed for the first and second locations.

2. The method of claim 1 wherein the one or more suppliers have the capability of delivering the one or more products or services to the first and second locations based on one or more supply terms.

3. The method of claim 2 wherein the one or more supply terms are defined by a buyer and include at least a price.

4. The method of claim 3 further comprising reallocating the electronic BPA from the buyer to a reallocated buyer.

5. The method of claim 1 wherein the electronic blanket BPA includes a coverage.

6. The method of claim 1 wherein the electronic blanket BPA includes a supplier and supplier site description.

7. The method of claim 1 wherein the electronic blanket BPA includes a supplier indicator.

8. The method of claim 1 wherein the electronic BPA includes a maximum release value.

9. The method of claim 1 further comprising updating an item master database to obtain an updated item master database based on the electronic BPA.

10. The method of claim 1 wherein the one or more supply terms include a payment plan.

11. The method of claim 1 further comprising receiving a part history for the one or more products and services, wherein the part history includes one or more superceded part prices.

12. The method of claim 11 further comprising searching the part history for the one or more superceded part prices.

13. The method of claim 1 wherein the electronic BPA includes one or more plant-specific prices and one or more price effective dates.

14. A computer-implemented system for creating blanket purchase agreements in a manufacturing enterprise, the system comprising at least one server computer for communicating with at least one client computer, the at least one server computer being configured to:

identify one or more products or services needed for a first and second location, the first production plant operating in a first legal entity and the second location operating in a second legal entity;

identify one or more suppliers having the capability of delivering the one or more products or services to the first and second locations; and create a blanket purchase agreement (BPA), the BPA including descriptions for the one or more products or services needed for the first and second locations.

15. The system of claim 14 wherein the one or more suppliers have the capability of delivering the one or more products or services to the first and second locations based on one or more supply terms.

16. The system of claim 15 wherein the one or more supply terms are defined by a buyer and include at least a price.

17. The system of claim 16 wherein the at least one server computer is further configured to reallocate the BPA from the buyer to a reallocated buyer.

18. The system of claim 14 wherein the at least one server computer is further configured to update an item master database to obtain an updated item master database based on the BPA.

19. The system of claim 14 wherein the one or more supply terms include a payment plan.

20. The system of claim 14 wherein the at least one server computer is further configured to receive a part history for the one or more products or services, wherein the part history includes one or more superceded part prices.

21. The system of claim 20 wherein the at least one server computer is further configured to search the part history for one or more superceded part prices.

22. The system of claim 14 wherein the BPA includes one or more plant-specific prices and one or more price effective dates.

23. A computer-readable product for creating blanket purchase agreements in a manufacturing enterprise, the product being produced by a computer-implemented process, the process comprising:

identifying one or more products or services needed for a first and second location, the first production plant operating in a first legal entity and the second location operating in a second legal entity;

identifying one or more suppliers having the capability of delivering the one or more products or services to the first and second locations;

creating a blanket purchase agreement (BPA), the BPA including descriptions for the one or more products or services needed for the first and second locations; and storing the BPA in a computer-readable product.

24. The computer-readable product of claim 23 wherein the BPA is stored in a purchasing database.

25. A program for controlling a computer of a server for creating blanket purchase agreements in a manufacturing enterprise, the program comprising:

instructions for identifying one or more products or services needed for a first and second location, the first production plant operating in a first legal entity and the second location operating in a second legal entity;

instructions for identifying one or more suppliers having the capability of delivering the one or more products or services to the first and second locations; and instructions for creating a blanket purchase agreement (BPA), the BPA including descriptions for the one or more products or services needed for the first and second locations.

26. The program of claim 25 wherein the one or more suppliers have the capability of delivering the one or more products or services to the first and second locations based on one or more supply terms.

27. The program of claim 26 wherein the one or more supply terms are defined by a buyer and include at least a price.

28. The program of claim 27 further comprising instructions for reallocating the BPA from the buyer to a reallocated buyer.

29. The program of claim 25 further comprising instructions for updating an item master database to obtain an updated item master database based on the BPA.

30. The program of claim 25 wherein the one or more supply terms include a payment plan.

31. The program of claim 25 further comprising instructions for receiving a part history for the one or more products or services, wherein the part history includes one or more superceded part prices.

32. The program of claim 25 further comprising instructions for searching the part history for the one or more superceded part prices.

33. The program of claim 25 wherein the BPA includes one or more plant-specific prices and one or more price effective dates.

* * * * *